US008570944B2

(12) United States Patent
Bhalla et al.

(10) Patent No.: US 8,570,944 B2
(45) Date of Patent: Oct. 29, 2013

(54) INTERNETWORKING TECHNIQUES FOR WIRELESS NETWORKS

(75) Inventors: Rajesh Bhalla, Gahanna, OH (US);
Yonggang Fang, San Diego, CA (US);
Xiaowu Zhao, Shenzhen (CN)

(73) Assignee: ZTE (USA) Inc., Iselin, NJ (US)

( * ) Notice: Subject to any disclaimer, the term of this patent is extended or adjusted under 35 U.S.C. 154(b) by 7 days.

(21) Appl. No.: 12/778,108

(22) Filed: May 11, 2010

(65) Prior Publication Data

US 2011/0080870 A1    Apr. 7, 2011

Related U.S. Application Data

(60) Provisional application No. 61/177,228, filed on May 11, 2009, provisional application No. 61/181,269, filed on May 26, 2009.

(51) Int. Cl.
*H04W 4/00* (2009.01)

(52) U.S. Cl.
USPC .......................................................... 370/328

(58) Field of Classification Search
USPC .............. 370/328, 310.2, 331, 436, 310, 332, 370/338, 312, 315, 320, 441; 455/432.1, 455/436, 452.2
See application file for complete search history.

(56) References Cited

U.S. PATENT DOCUMENTS

| 7,257,403 B2 * | 8/2007 | Nikkelen ........................ 455/436 |
| 7,554,949 B2 * | 6/2009 | Chen .............................. 370/331 |
| 7,746,836 B2 * | 6/2010 | Jentz et al. ..................... 370/338 |
| 8,218,436 B2 * | 7/2012 | Zhao et al. ..................... 370/230 |
| 2004/0063426 A1 | 4/2004 | Hunkeler |
| 2006/0029096 A1 * | 2/2006 | Babbar et al. ................. 370/466 |
| 2006/0270411 A1 | 11/2006 | Grayson |
| 2009/0052384 A1 * | 2/2009 | Zisimopoulous et al. .... 370/329 |
| 2009/0117891 A1 | 5/2009 | Chou |
| 2010/0046428 A1 | 2/2010 | Lee et al. |
| 2011/0065435 A1 * | 3/2011 | Pancorbo Marcos et al. 455/436 |

OTHER PUBLICATIONS

James Carlson, Network Working Group Internet-Draft, Aug. 2004, PPP Vendor Protocol.*
"Band Class Specification for cdma2000 Spread Spectrum Systems Revision E," 3rd Generation Partnership Project 2 (3GPP2), 3GPP2 No. C.S0057-E v1.0, 190 pages, Oct. 2010.
"Band Class Specification for cdma2000 Spread Spectrum Systems," 3rd Generation Partnership Project 2 (3GPP2), 3GPP2 No. C.S0057-0 v1.0, 89 pages, Feb. 2004.
"Band Class Specification for cdma2000 Spread Spectrum Systems," 3rd Generation Partnership Project 2 (3GPP2), 3GPP2 No. C.S0057-A v1.0, 123 pages, Jan. 2006.
"Band Class Specification for cdma2000 Spread Spectrum Systems," 3rd Generation Partnership Project 2 (3GPP2), 3GPP2 No. C.S0057-B v1.0, 129 pages, Aug. 2006.

(Continued)

*Primary Examiner* — Anh Ngoc Nguyen
(74) *Attorney, Agent, or Firm* — Perkins Coie LLP (57) ABSTRACT

Techniques, apparatuses, and systems can include mechanisms for interworking different wireless technologies. Interworking different wireless technologies can include operating a wireless communication system that includes a first wireless network based on a first wireless technology and a second wireless network based on a second wireless technology. Interworking different wireless technologies can include processing a network based change to an Aggregated Maximum Bit Rate (AMBR) parameter that corresponds to an Access Point Name (APN) and communicating the network based change to a wireless device.

14 Claims, 8 Drawing Sheets

(56) References Cited

OTHER PUBLICATIONS

"Band Class Specification for cdma2000 Spread Spectrum Systems," 3rd Generation Partnership Project 2 (3GPP2), 3GPP2 No. C.S0057-C v1.0, 180 pages, Jul. 2008.

"Band Class Specification for cdma2000 Spread Spectrum Systems," 3rd Generation Partnership Project 2 (3GPP2), 3GPP2 No. C.S0057-D v1.0, 180 pages, Sep. 2009.

"E-UTRAN—cdma2000 Connectivity and Interworking: Air Interface Specification," 3rd Generation Partnership Project 2 (3GPP2), 3GPP2 No. C.S0087-0 v1.0, 219 pages, May 2009.

"E-UTRAN—eHRPD Connectivity and Interworking: Core Network Aspects," 3rd Generation Partnership Project 2 (3GPP2), 3GPP2 No. X.S0057-0 v1.0, 154 pages, Apr. 2009.

"E-UTRAN—eHRPD Connectivity and Interworking: Core Network Aspects," 3rd Generation Partnership Project 2 (3GPP2), 3GPP2 No. X.S0057-0 v3.0, 195 pages, Sep. 2010.

"E-Utran—eHRPD Connectivity and Interworking: Core Network Aspects," 3rd Generation Partnership Project 2 (3GPP2), 3GPP2 No. X.S0057-0 v2.0, 182 pages, Dec. 2009.

"IP-based Service Architecture—System Requirements," 3rd Generation Partnership Project 2 (3GPP2), 3GPP2 No. S.R0057-0 v1.0, 12 pages, Jul. 2002.

\* cited by examiner

INTERNETWORKING TECHNIQUES FOR WIRELESS NETWORKS

PRIORITY CLAIM AND CROSS REFERENCE TO RELATED APPLICATIONS

This document claims the benefit of the priority of U.S. Provisional Application Ser. No. 61/177,228, filed May 11, 2009 and entitled "Internetworking Techniques for Evolved High Rate Packet Data (EHRPD) Network and Evolved Universal Terrestrial Radio Access Network (E-UTRAN)," and U.S. Provisional Application Ser. No. 61/181,269, filed May 26, 2009 and entitled "Internetworking Techniques for Evolved High Rate Packet Data (EHRPD) Network and Evolved Universal Terrestrial Radio Access Network (E-UTRAN)," the entire contents of which are incorporated by reference as part of the disclosure of the this document.

BACKGROUND

This document relates to wireless communications in wireless communication systems.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station emits radio signal that carry data such as voice data and other data content to wireless devices. A base station can be referred to as an access point (AP) or access network (AN) or can be included as part of an access network or a base station subsystem (BSS). Further, a wireless communication system can include a core network that is in communication with one or more base stations. A base station can transmit a radio signal on a forward link (FL), also called a downlink (DL), to one or more wireless devices. A wireless device can transmit a radio signal on a reverse link (RL), also called an uplink (UL), to one or more base stations.

A wireless device can use one or more different wireless technologies for communications. Various examples of wireless technologies include Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), evolved UTRAN (E-UTRAN), Long-Term Evolution (LTE), and Worldwide Interoperability for Microwave Access (WiMAX).

SUMMARY

This patent document describes technologies, among other things, for interworking between wireless technologies.

In one aspect, techniques for interworking between wireless technologies can include operating a wireless communication system that includes a first wireless network based on a first wireless technology and a second wireless network based on a second wireless technology. The techniques can include processing a network based change to an Aggregated Maximum Bit Rate (AMBR) parameter that corresponds to an Access Point Name (APN) and communicating the network based change to a wireless device. Other implementations can include corresponding systems, apparatus, and computer programs, configured to perform the actions of the techniques, encoded on computer readable mediums.

These and other implementations can include one or more of the following features. Communicating the network based change to the wireless device can include sending information indicative of the AMBR parameter to the wireless device via a Vendor-Specific Network Protocol signaling. Communicating the network based change to the wireless device can include sending information indicative of the AMBR parameter to the wireless device via a Vendor-Specific Network Control Protocol signaling. Communicating the network based change to the wireless device can include sending information indicative of the AMBR parameter to the wireless device via a Vendor Specific Protocol. Implementations can include operating a network entity, e.g., communication server, gateway, computer, associated with the first wireless network to generate the network based change. Communicating the network based change to the wireless device can include transmitting a change to the AMBR parameter via the second wireless network.

A wireless communication system can include a first wireless network to provide wireless service to wireless devices; a second wireless network to provide wireless service to wireless devices; a gateway, in communication with the first and second wireless networks, configured to process a network based change to an Aggregated Maximum Bit Rate (AMBR) parameter that corresponds to an Access Point Name (APN); and a base station, in the second wireless network, that is configured to communicate the network based change in a message to a wireless device. In some implementations, the message is communicated via a Vendor-Specific Network Protocol signaling. In some implementations, the message is communicated to the wireless device via a Vendor-Specific Network Control Protocol signaling. In some implementations, the message is communicated to the wireless device via a Vendor Specific Protocol. Implementations can include a network entity, in communication with the first wireless network, that is configured to generate the network based change. Implementations can include a wireless device configured to receive a message describing the network based change. In some implementations, the wireless device is configured to use the AMBR parameter for multiple Internet Protocol-Connectivity Access Network (IP-CAN) sessions.

The details of one or more embodiments are set forth in the accompanying drawings and the description below. Other features and advantages will be apparent from the description and drawings, and from the claims.

DETAILED DESCRIPTION

This document describes, among other things, techniques, apparatuses, and systems for interworking different wireless technologies such as internetworking techniques for two or more wireless networks such as eHRPD and E-UTRAN. A described internetworking technique provides network-initiated Access Point Name (APN)-Aggregated Maximum Bit Rate (AMBR) update procedures to enhance Vendor-Specific Network Protocol (VSNP) processing and/or Vendor-Specific Network Control Protocol (VSNCP) processing.

A wireless communication system can include multiple wireless networks, e.g., one or more wireless networks based on a wireless technology standard and one or more wireless networks based on another wireless technology standard. A wireless device can include one or more radios based on or more wireless standards, respectively, to communicate with the wireless communication system. For example, a wireless device can include a first radio for a first wireless technology standard, such as eHRPD, and a second radio for a second wireless technology standard, such as E-UTRAN. In some implementations, a wireless device can include a radio that is configurable for two or more types of communications based on two or more wireless standards, respectively.

A HRPD Serving Gateway (HSGW), in a wireless communication system, and a wireless device are edge functional entities on the eHRPD access part of an eHRPD and E-UTRAN interworking networks. The HSGW can interface with a Packet Data Network (PDN) Gateway (P-GW) and a Policy and Charging Rules Function (PCRF) functional entities in an Evolved Packet System (EPS) core.

Service connections can be used between the wireless device and the HSGW for the transport of signaling information and user data transport. Such service connections are logical connections established between the wireless device and the HSGW. Various examples of service connections include a main service connection and auxiliary service connections. A Point-to-Point Protocol (PPP) with vendor extensions can be used for signaling and user data transport over the main service connection. Auxiliary service connections can use PPP. However, auxiliary service connections without the use of PPP can be supported.

The wireless device and the HSGW can use PPP with vendor extensions for signaling and user data transport over a main service connection. A Vendor Specific Network Control Protocol (VSNCP) is a signaling protocol used over a main service connection. A Vendor Specific Network Protocol (VSNP) is used for user data transport. Configuration parameters can be exchanged between the wireless device and the HSGW during a user session establishment between the wireless device and the Evolved Packet Core (EPC) by the use of VSNCP protocol. The scope of such parameters exchanged between the wireless device and HSGW may be limited to a specific user session, e.g., a PDN Connection or Internet Protocol-Connectivity Access Network (IP-CAN) session.

There is a need for extensible mechanisms to allow for the exchange of configuration information between wireless devices and network components, e.g., a wireless device and a HSGW, dynamically during on-going user sessions. Such configuration information can pertain to a single user session, or to several or all user sessions between the wireless device and the EPS network entities.

This document includes techniques for enabling such exchange of configuration information between the wireless device and the HSGW. One of the techniques is based on a VSNP framework. Another technique is based on a VSNCP framework. Yet another technique is based on a Vendor Specific Protocol (VSP).

Figure 1:
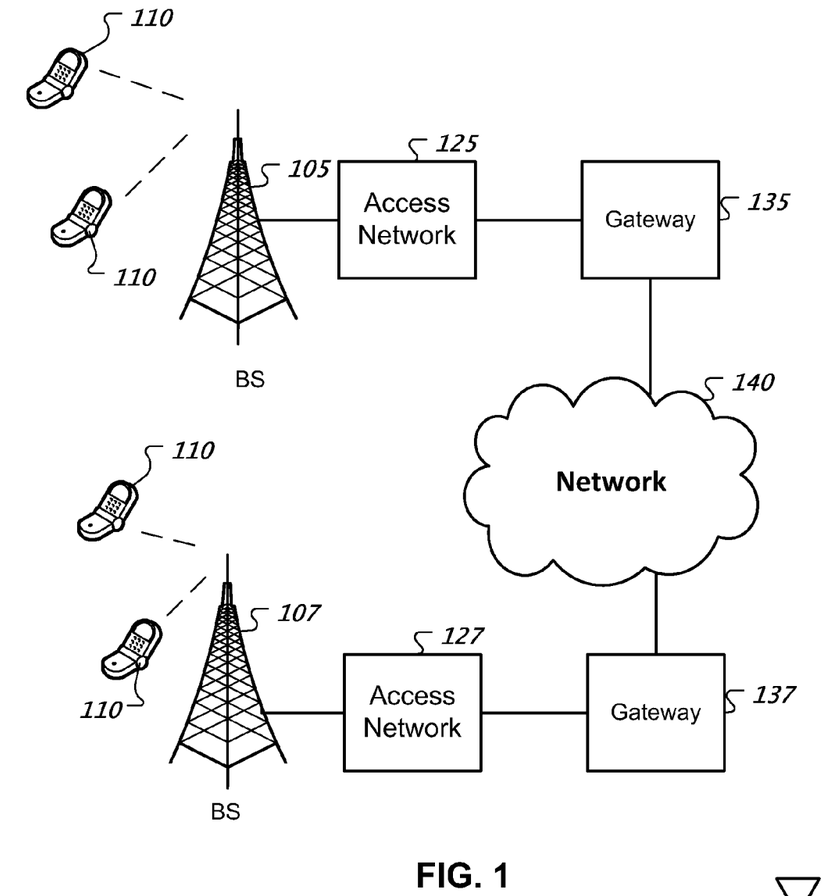
FIG. 1 shows an example of a wireless communication system.

FIG. 1 shows an example of a wireless communication system. A wireless communication system can include one or more base stations (BSs) 105, 107 to provide wireless service to one or more wireless devices 110. A base station 105, 107 can transmit a signal to one or more wireless devices 110. A wireless device 110 can transmit a signal to one or more base stations 105, 107. A wireless communication system can include one or more Access Networks (ANs) 125, 127 and a data gateway 135, 137 for each AN 125, 127. In some implementations, ANs 125, 127 include respectively base stations 105, 107. Gateways 135, 137 can communicate with a Packet Data Network (PDN) via a PDN Gateway (P-GW) via a network 140. Gateways 135, 137 can communicate with each other via a network 140. In some implementations, a wireless communication system can include multiple P-GWs to communicate with different PDNs. In some implementations, a wireless communication system can include a Policy and Charging Rules Function (PCRF).

Base stations 105, 107 can use different wireless technologies. For example, a first base station 105 can use an E-UTRAN wireless technology and a second base station 107 can use an eHRPD wireless technology. Examples of wireless communication systems that can implement the present techniques and systems include, among others, wireless systems based on Long-Term Evolution (LTE), Code division Multiple Access (CDMA) such as CDMA2000 1×, High Rate Packet Data (HRPD), and WiMAX.

In some implementations, a wireless communication system can include a Mobility Management Entity (MME), Serving Gateway (S-GW), and a Packet Data Network (PDN) Gateway (P-GW). In some implementations, a wireless communication system can include a HRPD SGW (HSGW), PDN GW, and an evolved Access Network/Packet Control Function (eAN/ePCF). A HSGW can provide an interconnection between wireless devices and a 3GPP EPS architecture, including seamless mobility, Policy and Charging Control (PCC), and roaming between LTE and HRPD. In some implementations, a wireless communication system can include one or more evolved NodeB (eNB) base stations and one or more eHRPD base stations. A wireless communication system can include a Policy Charging Rule Function (PCRF).

Figure 2:
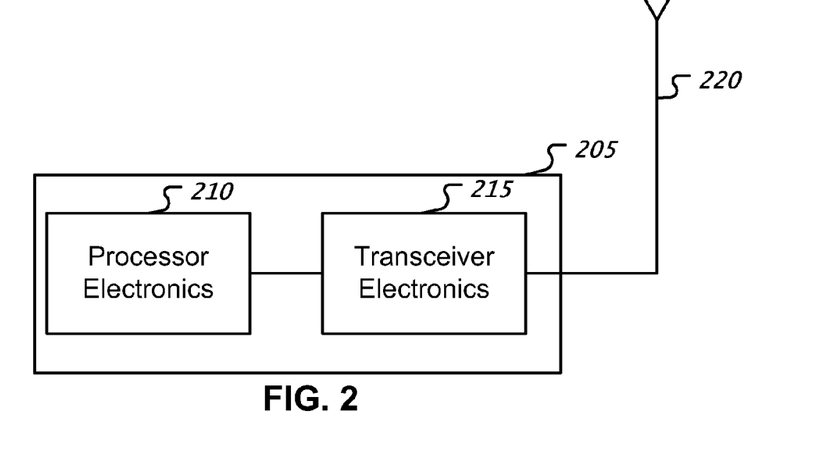
FIG. 2 shows an example of a radio station architecture.

FIG. 2 shows an example of a radio station architecture. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as an antenna 220. A radio station 205 can include other communication interfaces for transmitting and receiving data. A radio station 205 can include one or more memories configured to store information such as data and/or instructions.

Figure 3:
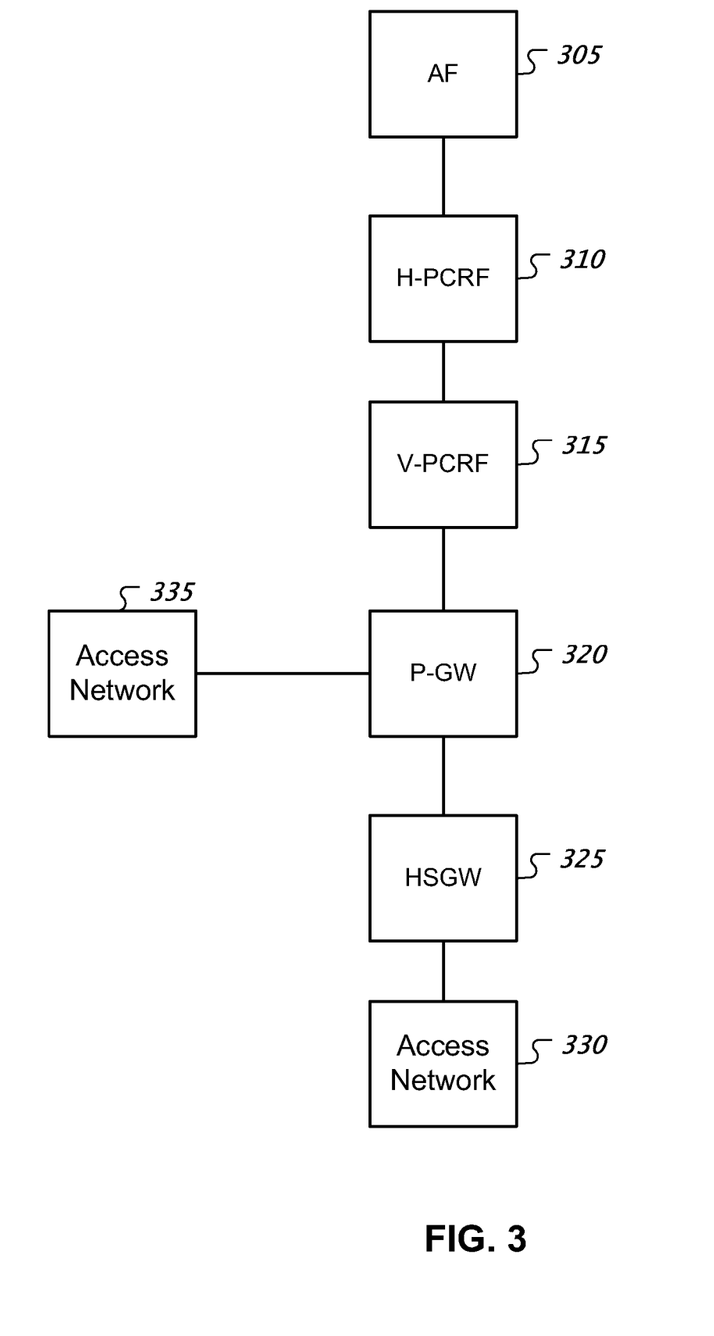
FIG. 3 shows another example of a wireless communication system.

FIG. 3 shows another example of a wireless communication system. A wireless communication system can include an Application Function (AF) 305, two or more PCRFs such as a home PCRF 310, a visiting PCRF 315 to provide PCRF services to a roaming wireless device, a P-GW 320, a HSGW 325, and multiple access networks 330, 335. The P-GW 320 can communicate with multiple access networks.

A PCRF can receive the subscribed APN-AMBR from the Bearer Binding and Event Reporting Function (BBERF) and send an authorized APN-AMBR to the BBERF for proxy mobile IP (PMIP)-based non-3GPP accesses. A wireless communication system can provide APN-AMBR update procedures between the PCRF, Policy Charging Execution Function (PCEF), and BBERF entities. Such updates to APN-AMBR can happen during an IP-CAN session establishment or can happen at any time as long as there is an IP-CAN session active for that APN. In some implementations, an update procedure can handle APN-AMBR updates during IP-CAN session establishment. In some implementations, APN-AMBR can restrict an aggregated maximum bit rate that can be expected to be provided by one or more PDN connections in the same APN. This document describes, among other things, technologies for updating the APN-AMBR at a wireless device for network-initiated events during an ongoing IP-CAN session(s).

3GPP Specifications describe, among other things, provisioning of authorized Quality of Service (QoS) per APN. A PCRF can provision the authorized Quality of Service (QoS) per APN as part of the IP-CAN session establishment procedure and can be modified at any time as long as there is an IP-CAN session active for that APN. The authorized QoS per APN can be modified as part of the IP-CAN session establishment or modification of any of the IP-CAN sessions active for a UE within that APN. The last provided value replaces the old value associated with a certain UE and APN aggregate regardless of which IP-CAN session is modified in case multiple IP-CAN sessions exist for the same APN. The authorized QoS per APN can be provisioned at RAR or CCA command level using the QoS-Information AVP including the APN-Aggregate-Max-Bitrate-UL AVP and/or the APN-Aggregate-Max-Bitrate-DL AVP. When APN-Aggregate-Max-Bitrate-UL AVP and/or the APN-Aggregate-Max-Bitrate-DL AVP are provided, the Max-Requested-Bandwidth values, and in some implementations the Guaranteed Bitrate values is not required to be included. The QoS per APN can limit the aggregate bit rate of all Non GBR bearers of the same APN, e.g., the GBR bearers are outside the scope of QoS per APN. The PCRF can provision the authorized QoS per APN, based on information obtained from the SPR or internal policies.

A PCRF can provision the authorized QoS per APN as part of the Gateway Control and QoS rules provision procedure. The authorized QoS per APN can be modified at Gateway Control session establishment and also at Gateway Control session modification. The last provided value replaces the old value associated with a certain UE and APN. The authorized QoS per APN can be provisioned at RAR or CCA command level using the QoS-Information AVP including the APN-Aggregate-Max-Bitrate-UL AVP and/or the APN-Aggregate-Max-Bitrate-DL AVP. When APN-Aggregate-Max-Bitrate-UL AVP and/or the APN-Aggregate-Max-Bitrate-DL AVP are provided, the Max-Requested-Bandwidth values, and in some implementations the Guaranteed Bitrate values are not required to be included. The QoS per APN can limit the aggregate bit rate of all Non GBR bearers of the same APN, e.g., the GBR bearers are outside the scope of QoS per APN. Upon receiving the subscribed AMBR per APN from the BBERF, the PCRF can provision the AMBR per APN to the PCEF for enforcement using the provisioning of authorized QoS per an APN procedure.

Figure 4:
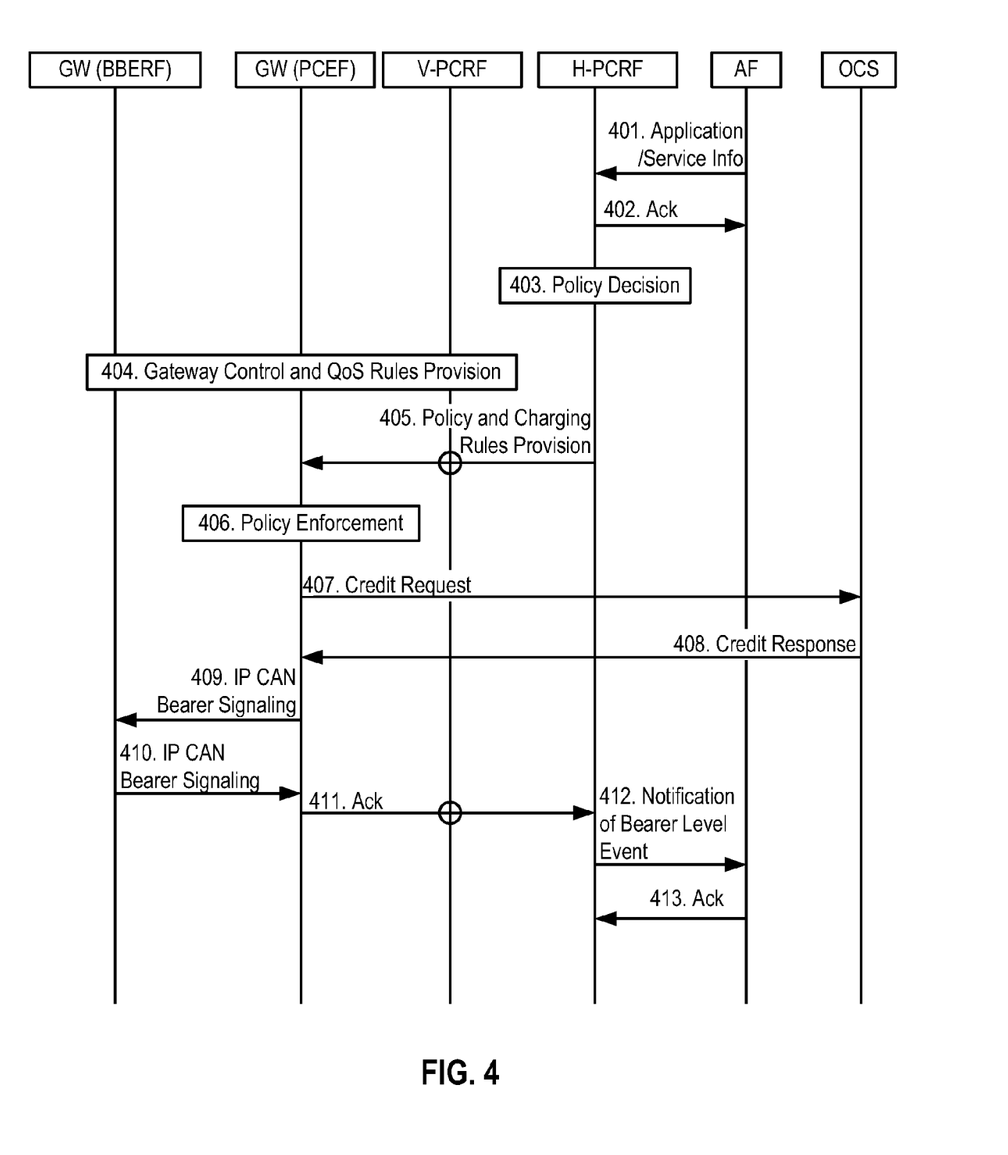
FIG. 4 shows an example of an Internet Protocol-Connectivity Access Network session modification initiated by a Policy Charging Rule Function.

FIG. 4 shows an example of an IP-CAN session modification initiated by a PCRF. At 401, an Application Function (AF) initiates a modification of IP-CAN session QoS parameters by sending a message to a PCRF. Events such as events related to SPR and policy updates events can trigger a modification of IP-CAN session QoS parameters. Based on a network initiated IP-CAN session modification, at 403, the PCRF makes the appropriate authorization and policy decision. Based on the decision, the PCRF causes an update of associated policy information at a BBERF. In a roaming scenario, PCRF message traffic can be forwarded between the Visiting PCRF (V-PCRF) and the Home PCRF (H-PCRF).

At 404, the PCRF can initiate a Gateway Control and QoS Rules Provision Procedure. In some implementations, where there are multiple BBERFs associated with the IP CAN session, a Gateway Control and QoS Rules Provision Procedure can be performed with the BBERFs that support UE/NW bearer establishment mode. In some implementations where there is a Gateway Control and QoS Rules Reply pending, e.g. this procedure was invoked from the Gateway Control and QoS Rules Request procedure, the PCRF uses that opportunity for provisioning the applicable QoS rules. In some implementations where there are multiple BBERFs associated with the IP CAN session, and the procedure was invoked by a Gateway Control and QoS Rules Request procedure from the primary BBERF, the PCRF receives a Gateway Control and QoS Rules Request from the non-primary BBERFs. If there is a Gateway Control and QoS Rules Reply pending, the PCRF can use that opportunity for provisioning the applicable QoS rules to the BBERF. However, if there is no Gateway Control and QoS Rules Reply pending, at 404, the PCRF can initiate a Gateway Control and QoS Rules Provision procedure with the BBERF.

At 405, the PCRF sends a policy and charging rules provision message to the PCEF. At 406, the PCEF performs a policy enforcement. At 407, the PCEF can send a Credit Request to an Online Charging System (OCS). The OCS replies, at 408, by sending a Credit Response. At 409, the PCEF sends an IP CAN Bearer Signaling message to the BBERF, and at 410 the BBERF responds with an IP CAN Bearer Signaling message. At 411, the PCEF sends an acknowledgement to the PCRF. At 412, the H-PCRF responds by sending a Notification of Bearer Level Event message to the AF. At 413, the AF replies with an acknowledgement. In some implementations, communication with a BBERF is conducted via a gateway. In some implementations, communication with a PCEF is conducted via a gateway.

Figure 5:
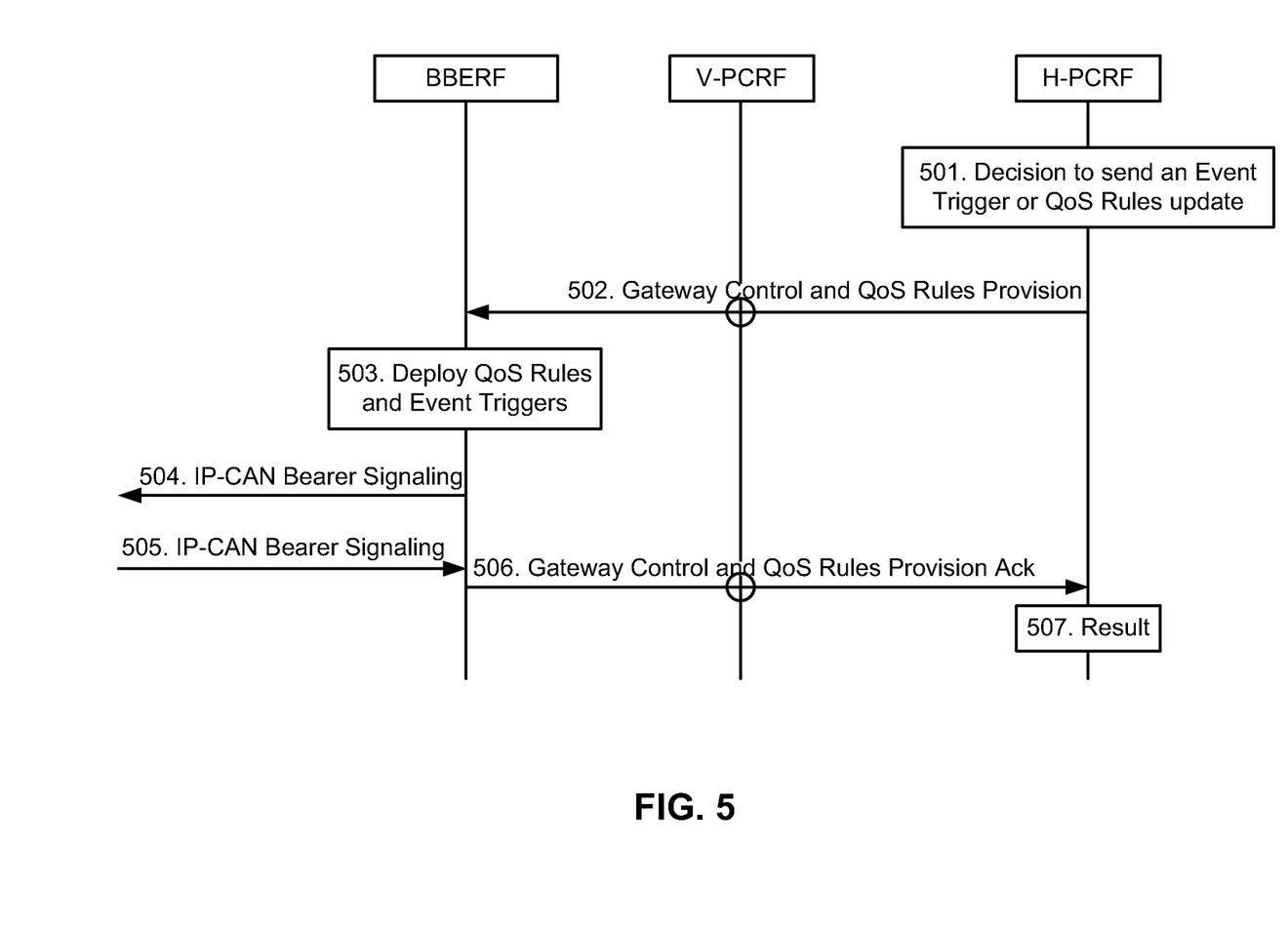
FIG. 5 shows an example of a gateway control session establishment during an attach.

FIG. 5 shows an example of a gateway control session establishment during an attach. At 501, a PCRF determines that an Event Trigger or QoS Rules update is to be sent. At 502, the PCRF initiates updates of QoS Rules at the BBERF by sending a Gateway Control and QoS Rules Provision message. At 503, the BBERF initiates procedures for enforcing the updated QoS Rules and Event Triggers with the access network entities by invoking access specific procedures. In some implementations, the BBERF, at 504, can send IP-CAN Bearer signaling to inform one or more network entities about the change. At 505, the BBERF can receive IP-CAN Bearer signaling from the one or more network entities that acknowledges the change. At 506, the BBERF sends a Gateway Control and QoS Rules Provision Ack to the PCRF. At 507, the PCRF determines a result of the decision to send an event trigger or QoS rules update.

A wireless communication system can provide one or more QoS rules modification procedures. For example, a wireless standard based on 3GPP2 describes procedures that correspond to steps of a network initiated IP-CAN session modification. A modification procedure can be applied to QoS Rules activation/update(s) that are specific to a single IP-CAN session. APN-AMBR, however, applies to all IP-CAN sessions associated with a UE and APN aggregate, regardless of which IP-CAN session is modified in case multiple IP-CAN sessions exist for the same APN. This document includes descriptions of one or more procedures for network initiated APN-AMBR modification during ongoing IP-CAN session(s).

A wireless standard based on 3GPP2 includes Network Initiated Dedicated Bearer Procedures for eHRPD Access that are specific to a certain IP-CAN bearer. The stated procedures are based on the use of VSNP protocol between the HSGW (BBERF) and the UE. VSNP signaling carries RSVP messages, with the HSGW initiating the RSVP procedures with a Resv message that carries 'Initiate Flow Request' TFT OpCode. A wireless device, e.g., UE, and the HSGW continue with the rest of the defined RSVP procedures for establishing and/or updating the associated IP-CAN bearer. The currently defined RSVP signaling procedures are specific to an IP-CAN bearer. An IP-CAN bearer is identified by the PDN-ID in VSNP header, and by the use of MSIPv4/v6 Address field in the IE Data field embedded in the 3GPP2 Object.

In some implementations, the RSVP signaling procedures can be applied to all IP-CAN bearers between the UE and APN aggregate by defining a wildcard PDN-ID, a wildcard MSIPv4/v6 Address, a TFT Operation Code (e.g., 'Modify UE-HSGW Parameters' operation code), and a Packet Filter List. A Packet Filter List can carry APN-AMBR information. In some implementations, signaling for a Network Initiated APN-AMBR Update can include one or more of the following: wildcard PDN-ID, wildcard MSIPv4/v6 Address, TFT Operation Code, and an enhanced Packet Filter List.

Figure 6:
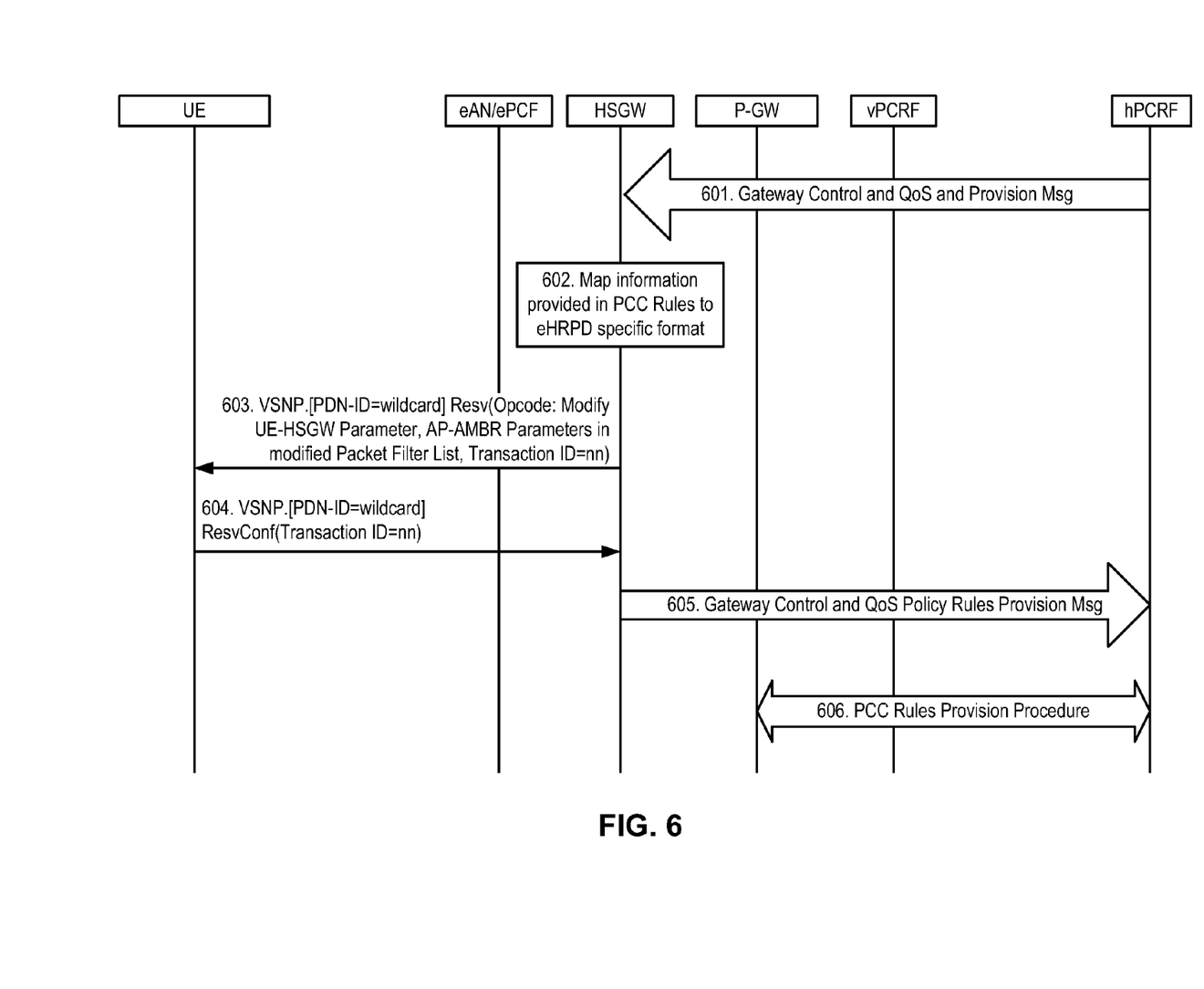
FIG. 6 shows an example of a Network Initiated APN-AMBR Update via a Vendor Specific Network Protocol.

FIG. 6 shows an example of a Network Initiated APN-AMBR Update via VSNP. At 601, a PCRF can send, to the HSGW, a message to initiate Gateway Control and Policy Rules Provisioning. The message can include information for modifying an APN-AMBR. At 602, the HSGW can map information provided in the PCC rules to a wireless technology standards format such as an eHRPD specific format. At 603, the HSGW sends, to a UE, VSNP signaling that includes a Resv message. For example, the HSGW can send a Resv message with a 'Modify UE-APN/PDN Parameters' TFT OpCode, a wildcard IPD-ID, and a wildcard MSIPv4/v6 address. The Resv message can include APN-AMBR parameters in an enhanced Packet Filter List field.

On successful processing of the received Resv message, the UE responds at 604 with a ResvConf message. ResvErr messages with appropriate error code etc. are defined for conveying error indication from the UE to the HSGW in case of failure of process Resv message at 603. Message retransmission rules can be used in RSVP signaling.

A VSNCP signaling between the UE and the HSGW can be used for establishing a PDN connection. In some implementations, on the receipt of the VSNCP Configure Request message from the UE, the HSGW can perform a Gateway Control Session Establishment procedures with the PCRF. In some implementations, at 605, the PCRF and HSGW can perform Gateway Control and QoS Rules Provision procedures. In case the APN-AMBR information is received from the PCRF, the HSGW forwards such information to the UE in HSGW initiated VSNCP Configure Request message. At 606, the PCRF sends a PCC Rules Provision Procedure to the GW.

In some implementations, the procedures for communicating APN-AMBR information to the UE can be available for the case where there is an ongoing PDN Connection Establishment with the desired APN. In other implementations when APN-AMBR is modified due to network-specific events during ongoing IP-CAN session(s), procedures for communicating the updated APN-AMBR to the UE is not required to exist.

In some implementations, the HSGW can wait for the next PDN Connection Establishment with the desired APN for conveying the APN-AMBR information to the UE. In such examples, the HSGW (BBERF) can signal such decision for deferring the enforcement of the updated APN-AMBR to the PDN Gateway via the PCRF. This can implement 3GPP2 specific enhancements to the 3GPP. In another example, 3GPP2 access specific procedures can be specified for APN-AMBR update.

Signaling for a network initiated APN-AMBR update via VSNCP includes one or more of the following: a wildcard PDN-ID, a new VSNCP Configuration Option (e.g., Modify UE-HSGW Parameters, Modify UE-APN Parameters) can be defined so the UE can determine the nature of the unsolicited VSNCP signaling, a new value for an existing VSNCP Configuration Option (e.g., Attach Type=Modify UE-APN/PDN Parameter) can be defined to achieve the stated purpose, and/or a VSNCP Configuration Option (e.g., UE-APN/PDN Parameters). Changes to the VSNCP signaling procedures are defined for the UE and the HSGW behavior for implementation of the (unsolicited) HSGW initiated VSNVP signaling procedures.

Figure 7:
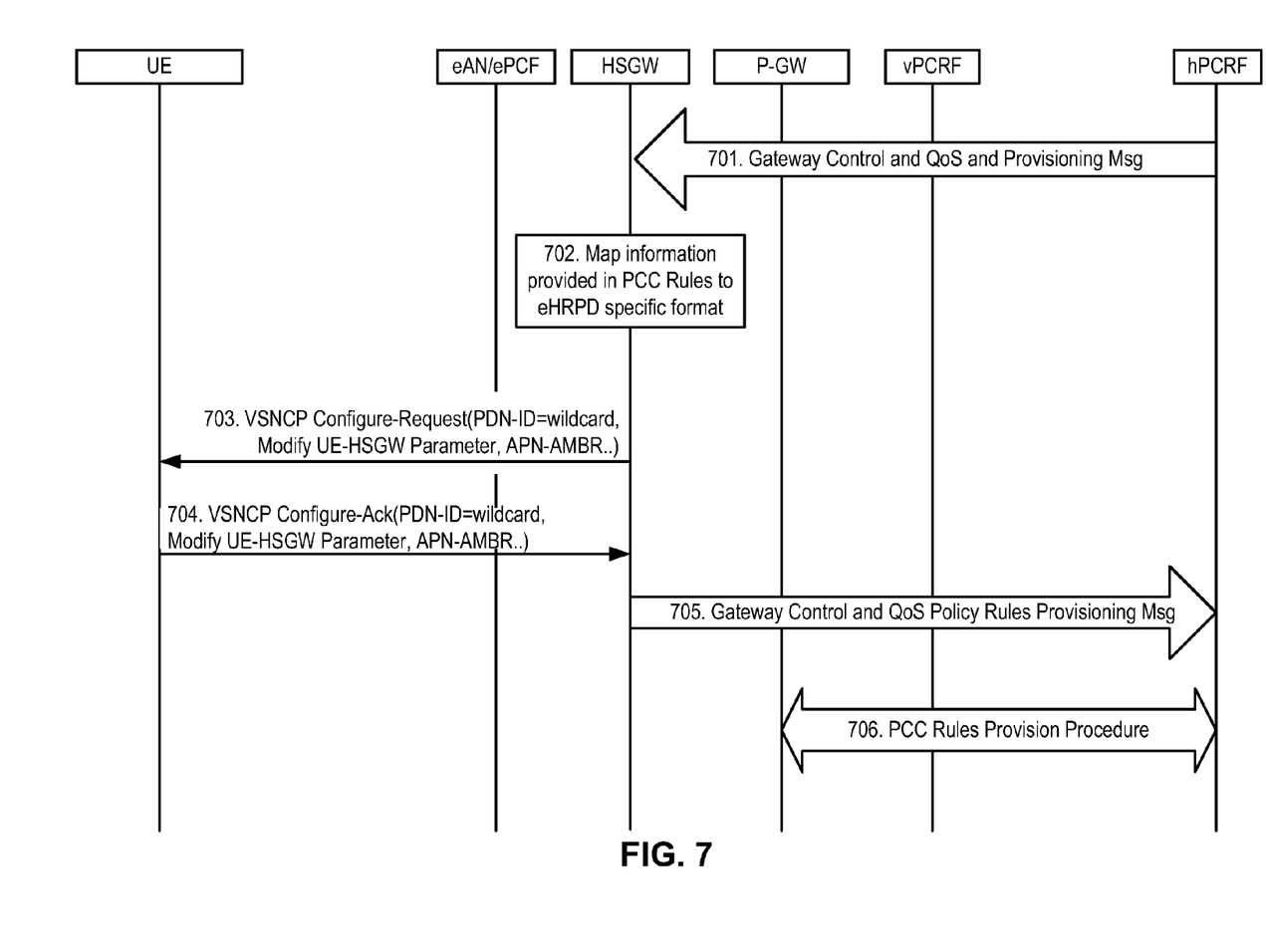
FIG. 7 shows an example of a Network Initiated APN-AMBR Update via a Vendor Specific Network Control Protocol.

FIG. 7 shows an example of a Network Initiated APN-AMBR Update via VSNCP. In this example, specifying 3GPP2 access specific procedures for an APN-AMBR update can be achieved by allowing HSGW initiated (unsolicited) VSNCP signaling between the HSGW and a wireless device, e.g., UE. At 701, the PCRF can send a Gateway Control and Policy Rules Provision message to the HSGW to modify the APN-AMBR parameter. At 702, the HSGW can map information provided in the PCC rules to a wireless technology standards format such as an eHRPD specific format.

At 703, the HSGW sends a VSNCP configure-request message. The message includes a PDN-ID wildcard, a Modify UE-HSGW Parameter opcode, and information about the update to the APN-AMBR. At 704, the HSGW can respond with a VSNCP configure-acknowledge message. At 705, the HSGW can send a message to inform the PCRF about a status the gateway control and QoS Policy Rules provisioning. At 705, the PCRF and HSGW performs Gateway Control and QoS Rules Provision procedures. At 706, the PCRF performs a PCC Rules Provision Procedure with the P-GW.

A wireless communication system can provide Vendor Specific Protocol (VSP) signaling for network initiated updates. In some implementations, VSP signaling is specific to a peer-to-peer link. In some implementations, VSP signaling is independent of the scope of network layer protocols. Once the underlying PPP framework has been established and peer entities authenticated (if so required), VSP signaling can be performed at any time without impacting protocol state. Variations to this disclosed 3GPP2 VSP framework and possible implementation are also possible to achieve the stated or enhanced objectives.

A network entity such as a UE or a HSGW can initiate an exchange of the parameters by the use of a VSP Configure-Request Message. On successful processing of the VSP Configure-Request message, the receiving entity can respond with a VSP Configure-Ack message. VSP protocol implementations can use the packet exchange and option negotiation mechanisms as Link Control Protocol (LCP) specified in RFC1661, but with a different set of options. A VSP packet can be carried in the PPP Information field, with the PPP Protocol field set to 0x405b. VSP packets can be exchanged between the UE and the HSGW after PPP has reached either Network-Layer Protocol or Authentication phase.

On the receipt of Gateway Control and Policy Rules Provision, e.g., receiving a message from the PCRF that modifies the APN-AMBR, the HSGW sends a VSP Configure-Request packet to the UE. The VSP Configure-Request packet contains the Access Point Name (APN) and APN-AMBR Configuration Options. On successful processing of the VSP Configuration-Request, the UE can respond with a VSP Configuration-Ack packet. For the case of UE initiated parameter exchange, the UE can initiate a VSP packet exchange by sending the VSP Configuration-Request packet, and the HSGW responds with VSP Configure-Ack packet for successful processing.

Figure 8:
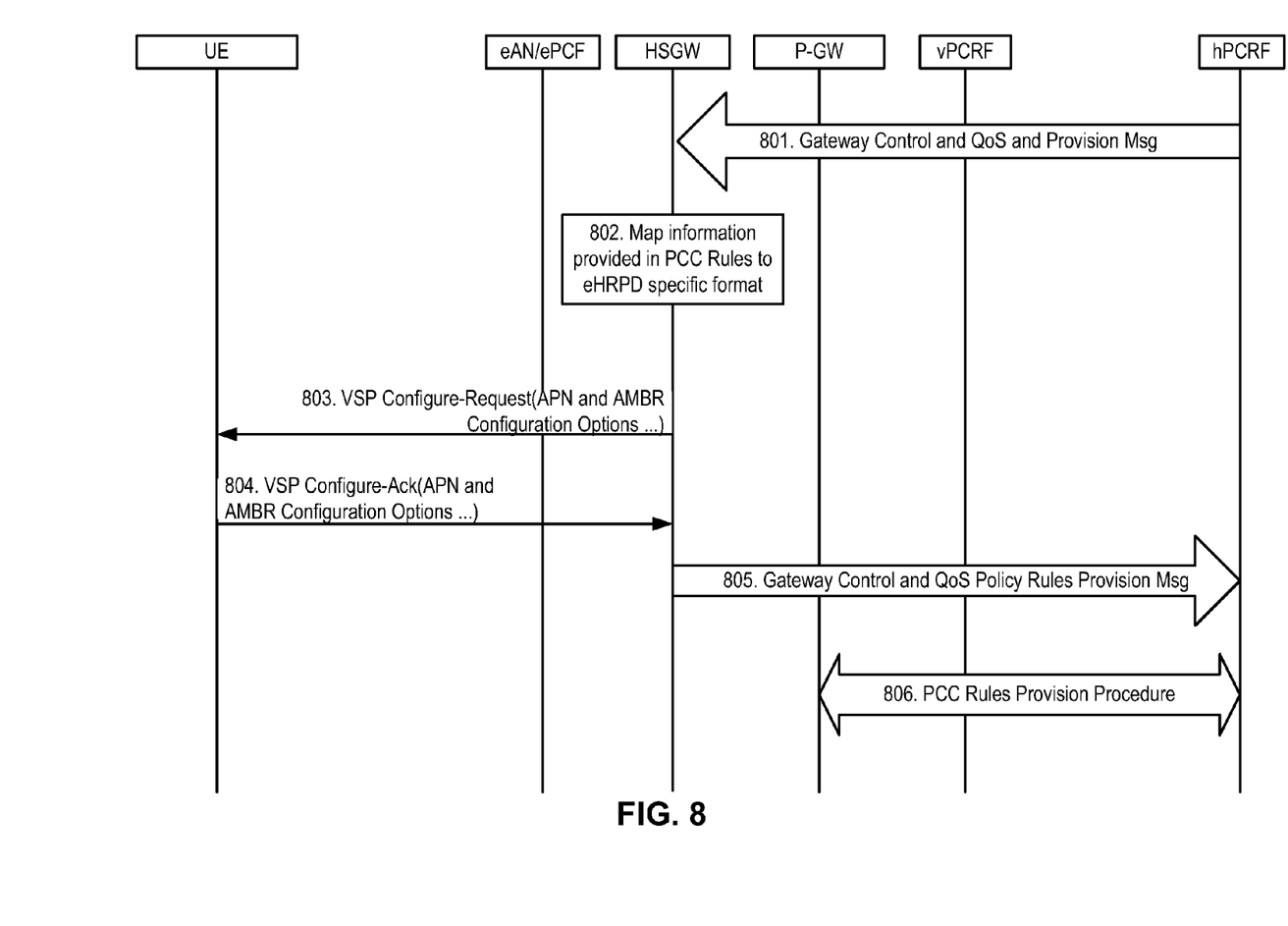
FIG. 8 shows a different example of a network initiated APN-AMBR Update via a Vendor Specific Protocol.

FIG. 8 shows a different example of a network initiated APN-AMBR Update via a Vendor Specific Protocol. At 801, the HSGW receives a Gateway Control and Policy Rules Provision, for example receiving a message from the PCRF that modifies at 802 the APN-AMBR, at 803 the HSGW sends a VSP Configure-Request packet to the UE. The VSP Configure-Request packet 803 contains the Access Point Name (APN) and APN-AMBR Configuration Options. On successful processing of the VSP Configuration-Request, at 804, the UE responds with a VSP Configuration-Ack packet. For the case of UE initiated parameter exchange, the UE can initiate a VSP packet exchange by sending the VSP Configuration-Request packet 803, and the HSGW responds, at 804, with a VSP Configure-Ack packet for successful processing. At 805, the PCRF and HSGW perform Gateway Control and QoS Rules Provision procedures. At 806, the PCRF sends a PCC Rules Provision Procedure to the GW.

Figure 9:
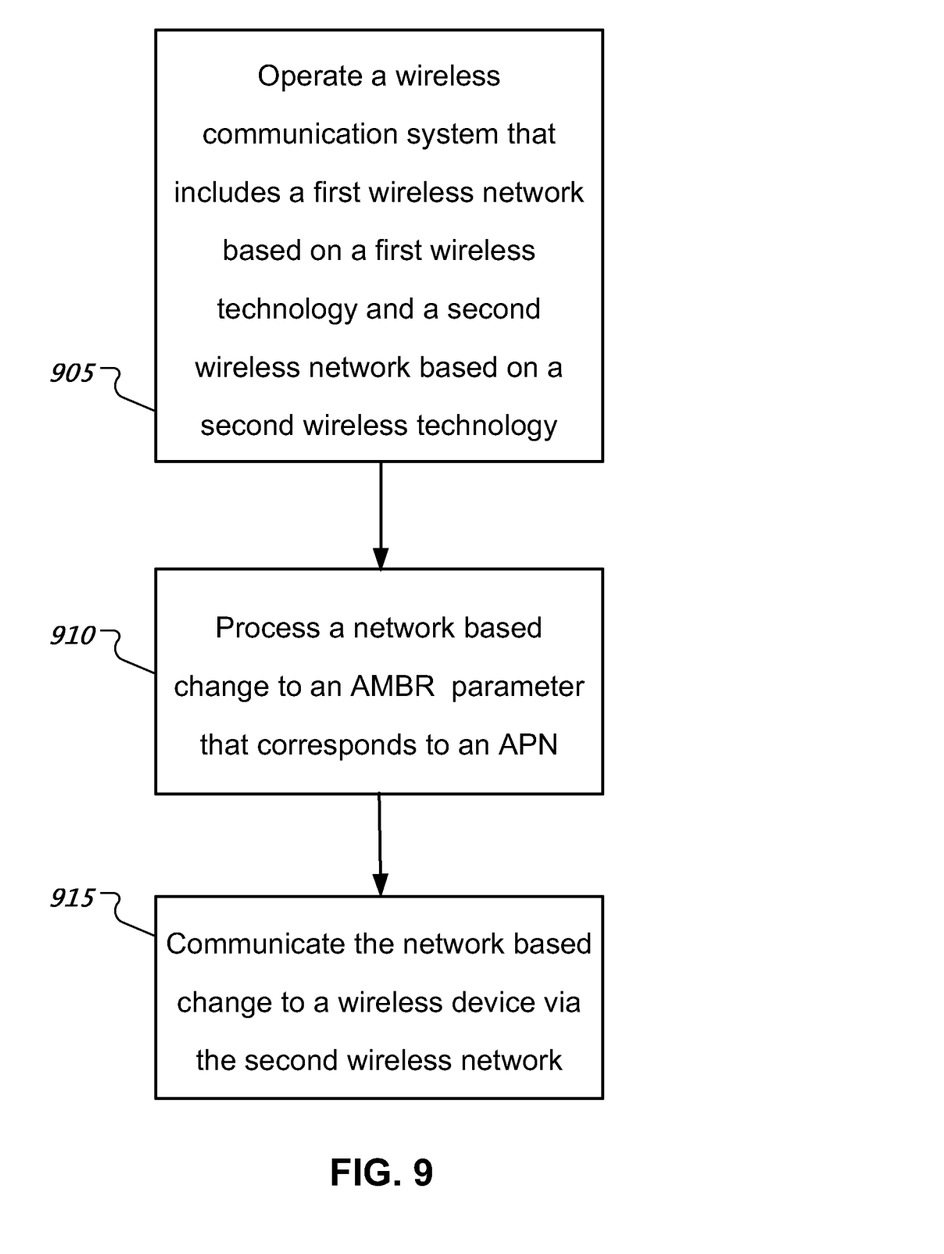
FIG. 9 shows an example of a network initiated communication process.

FIG. 9 shows an example of a network initiated communication process. At 905, a communication process can operate a wireless communication system that includes a first wireless network based on a first wireless technology and a second wireless network based on a second wireless technology. At 910, the communication process can process a network based change to an AMBR parameter that corresponds to an APN. At 915, the process can communicate the network based change to a wireless device via the second wireless network.

3GPP2 Vendor Specific Protocol (VSP) Packet for Parameter Exchange

A VSP packet format as defined in RFC3772 can be used for the exchange of configuration and operational parameter(s) between the UE and the HSGW, with some exceptions. In some implementations, VSP packets can use 3GPP2 Organizationally Unique Identifier (OUI) value 0xCF0002. The 3GPP2 VSP packet format is shown in Table 1.

TABLE 1

3GPP2 VSP Packet Format

| 0 1 2 3 4 5 6 7 8 9 0 1 2 3 4 5 6 7 8 9 0 1 2 3 4 5 6 7 8 9 0 1 | | |
|---|---|---|
| Magic-Number | | |
| OUI | | Reserved |
| Data ... | | |

The "Magic-Number" field is four octets and aids in detecting links that are in looped back condition. Until the Magic-Number Configuration Option has been successfully negotiated by LCP, the Magic-Number is transmitted as zero. The "OUI" field is set to a value of 0xCF0002. The "Reserved" field is set to zero on transmit and ignored on reception.

3GPP2 VSP Packet Data

The Data field of a 3GPP2 VSP packet (e.g., Table 1) can be encoded in the format shown in Table 2 below:

TABLE 2

VSP Packet Data Format

| 8 | 16 | 24 | 31 |
|---|---|---|---|
| Code | Identifier | Length | |
| Configuration Data | | | |

The "Code" field is one octet and identifies the kind of the VSP packet When a packet is received with a "Reserved" Code field value, the packet is silently discarded. Examples of Code values include "Parameter Configuration-Request," "Parameter Configuration-Ack," "Parameter Configuration-Reject." In some implementations, other values can be Reserved. The "Identifier" field is one octet. This field is used to match requests and replies. When a packet is received with an invalid Identifier field, the packet is silently discarded. The "length" field is two octets and indicates the length of the 3GPP2 VSP Data field, including the Code, Identifier, Length and the Configuration Data fields. The "Configuration Data" field includes zero or more Configuration Options.

3GPP2 VSP Parameter Configuration-Request Packet

The UE and the HSGW can send a Parameter Configuration-Request packet (Code=1) to notify the peer entity of one or more configuration and/or operational parameters. The Configuration Data field in the Parameter Configuration-Request packet can be filled with the desired Configuration Options specified in Table 7.

In some cases, a Configuration Option that is received in the Parameter Configuration-Request packet is not required to be recognized or can contain a value that is not supported (as configured by the operator). In such cases, the receiving entity can respond with a Parameter Configuration-Reject packet. In some implementations, upon reception of a valid Parameter Configuration-Request packet, the receiving entity can send Parameter Configuration-Ack packet with all received Configuration Options. In some implementations, Restart Timer and Max-Configure parameters as specified in RFC 1661 can be used for managing the retransmissions and maximum number of retransmissions of Parameter Configuration-Request packets. An example format of the Data field of the 3GPP2 VSP Parameter Configuration-Request packet is shown below in Table 3.

TABLE 3

Data Field of Parameter Configuration-Request Packet

| 0 | 8 | 16 | 24 | 31 |
|---|---|---|---|---|
| Code = 1 | Identifier | Length | | |
| Configuration Data | | | | |

The "Code" field is set to 1 for a Parameter Configuration-Request packet. The "Identifier" field is changed for each Parameter Configuration-Request packet sent whenever the contents of the Configuration Data field changes, and whenever a valid reply packet has been received for the previous request packet. For retransmissions, the Identifier value can remain unchanged. The "Length" field indicates the length of the Data field of Parameter Configuration-Request packet, including the Code, Identifier, Length and the Configuration Data fields. The "Configuration Data" field can be variable in length. The "Configuration Data" field can contain zero or more Configuration Options that the sender desires to notify to the peer entity.

3GPP2 VSP Parameter Configuration-Ack Packet

In some implementations wherein every Configuration Option received in the Parameter Configuration-Request packet is recognized and supported, the receiving entity can respond with a Parameter Configuration-Ack packet. The Parameter Configuration-Ack packet can include all Configuration Options received in the Parameter Configuration-Request packet, and the Configuration Options can not be reordered or modified.

In some implementations, the Identifier field in the Parameter Configuration-Ack packet can match that of the last transmitted Parameter Configuration-Request packet, else the Parameter Configuration-Ack packet can be silently discarded. In addition, the Configuration Options in the Parameter Configuration-Ack packet can also be matched with those of the last transmitted Parameter Configuration-Request packet. In examples where there is a failure to match the received Configuration Options, the Parameter Configuration-Ack packet can be silently discarded. An example format of the Data field of 3GPP2 VSP Parameter Configuration-Ack packet is shown in Table 4.

TABLE 4

Data Field of Parameter Configuration-Ack Packet

| 0 | 8 | 16 | 24 | 31 |
|---|---|---|---|---|
| Code = 2 | Identifier | | Length | |
| Configuration Data | | | | |

The "Code" field is set to a value of 2 for Parameter Configuration-Ack packet. The "Identifier" field is a copy of the Identifier field of the Parameter Configuration-Request packet which caused this Parameter Configuration-Ack. The "Length" field indicates the length of the Data field of Parameter Configuration-Ack packet; including the Code, Identifier, Length and the Configuration Data fields. The "Configuration Data" field can be variable in length and can contain zero or more Configuration Options that the sender is acknowledging to the peer entity.

3GPP2 VSP Parameter Configuration-Reject Packet

In some implementations, some Configuration Options received in the Parameter Configuration-Request packet are not recognized or contain a value not supported (as configured by the operator). The receiving entity can respond with a Parameter Configuration-Reject packet. The Configuration Data field of the packet can be filled with the unrecognized and/or unsupported Configuration Options from the Parameter Configuration-Request packet. Such Configuration Options can not be reordered or modified as specified in RFC1661. In addition, and Error Code Configuration Option can be included to indicate the reason for Parameter Configuration-Reject packet. In some implementations, the Error Code value can be used to indicate the reason for failure of the first unrecognized and/or unsupported Configuration Option in the Parameter Configuration-Reject packet.

The Identifier field of the Parameter Configuration-Reject packet can match that of the last transmitted Parameter Configuration-Request packet. In addition, the Configuration Options in the Parameter Configuration-Reject packet can be a subset of those in the last Parameter Configuration-Request packet, other than the Error Code Configuration Option. In some examples, the Invalid Parameter Configuration-Reject packet can be silently discarded.

In some implementations, reception of a valid Parameter Configuration-Reject packet can indicate that when a new Parameter Configuration-Request packet is sent, it does not include any of the Configuration Options in the Parameter Configuration-Reject packet, unless an administrative action has been taken by the operator to address the cause for the rejection of the Configuration Options in the Parameter Configuration-Ack packet.

TABLE 5

Data Field of Parameter Configuration-Reject Packet

| 0 | 8 | 16 | 24 | 31 |
|---|---|---|---|---|
| Code = 4 | Identifier | | Length | |
| Configuration Data | | | | |

An example format of the Data field of 3GPP2 VSP Parameter Configuration-Reject packet is shown in Table 5. The "Code" field is set to a value of 4 for Parameter Configuration-Reject packet. The "Identifier" field is a copy of the Identifier field of the Parameter Configuration-Request packet which caused this Parameter Configuration-Reject. The "Length" field indicates the length of the Data field of Parameter Configuration-Reject packet, including the Code, Identifier, Length and the Configuration Data fields. In some implementations, the "Configuration Data" field can be variable in length. In some implementations, the "Configuration Data" field can contain one or more Configuration Options that the sender is rejecting. In addition, Error Code Configuration Option can be included.

3GPP2 VSP Configuration Options

In some implementations, the Configuration Data field of a VSP packet can contain zero or more Configuration Options. The Configuration Options can be encoded as specified in RFC1661.

TABLE 6

Configuration Option Format

| 0 | 8 | 16 | 24 | 31 |
|---|---|---|---|---|
| Type | Length | | Configuration Option Value | |
| Configuration Option Value | | | | |

An example format of the Configuration Option is shown in Table 6. The "Type" field is one octet and indicates the type of the Configuration Option. Table 7 lists examples of the types of Configuration Options supported in this disclosure. The "Length" field is one octet and indicates the length of the Configuration Option in octets, including the Type, Length and Configuration Option Value fields. In some implementations, a recognized Configuration Option can be received in a Parameter Configuration-Request packet, but with an invalid or unrecognized length. In response, a Parameter Configuration-Reject packet with Error Code Configuration Option Value=1 (Configuration Option Not Recognized) can be transmitted. The "Configuration Option Value" is zero or more octets and can contains information specific to the Configuration Option. Table 7 lists examples of the Value fields of the Configuration Options supported in this disclosure.

Configuration Option Types

In some implementations, the 3GPP2 VSP Configuration Options can be encoded as specified in RFC1661 (e.g., the format illustrated in Table 6). Table 7 lists examples of 3GPP2 VSP Configuration Option types. In some implementations, a received Configuration Option that is unrecognized can be considered unacceptable per RFC 1661.

TABLE 7

VSP Configuration Option Types

| Configuration Option Name | Configuration Option Type (decimal) | Configuration Option Length (octets) | Configuration Option Value |
|---|---|---|---|
| Reserved | 00-01 | | Reserved |
| Access Point Name | 02 | 2-102 | Value field of the Access Point Name IE as defined in 3GPP TS 24.008 specifications clause 10.5.6.1 |
| Reserved | 03-05 | | Reserved |
| Error Code | 06 | 3 | Indicates the reason for failure. Table 8 lists the supported Error Code values. |
| Reserved | 07-09 | | Reserved |
| APN-AMBR | 10 | 4-8 | APN Aggregate Maximum Bit Rate. Encoded as the value field (octets 3-end) of the APN-AMBR as specified in sub clause 9.9.4.2 of 3GPP TS 24.301 specifications. |
| Reserved | 11-127 | | Reserved |
| Max PPP Inactivity Timer | 128 | 6 | 4-octet value See section 7.3.4 for details |
| Version and Capability Indication | 129 | 6 | One octet Version field. Three octet capability field. See section 7.3.3 for encoding details |
| Reserved | 130-255 | | Reserved |

TABLE 8

Error Code values

| Error Value - General Description | Explanation of Use |
|---|---|
| 1 - Not Recognized | Configuration Option Not Recognized |
| 2 - Not Supported | Configuration Option Value Not Supported |
| All other values are Reserved | |

Use of APN-AMBR Configuration Option

In some implementations, the UE and the HSGW support Access Point Name and APN-AMBR Configuration Options. In some implementations, the HSGW can send a Parameter Configuration-Request packet containing the Access Point Name and APN-AMBR Configuration Options when it receives authorized APN-AMBR (AMBR per APN) information from the EPC network, and there is no pending PDN Connection Establishment signaling with the UE. The last received valid APN-AMBR value can replace the old APN-AMBR value at the UE for all IP-CAN sessions with the APN.

In some implementations, the UE can send a Parameter Configuration-Request packet containing the Access Point Name and APN-AMBR Configuration Options when there is a change in the configured/subscribed APN-AMBR information, and there is no pending PDN Connection Establishment signaling with the HSGW.

Use of Version and Capability Indication Configuration Option

In some implementations, the UE and the HSGW can support a Version and Capability Indication Configuration Option. In some implementations, the HSGW is not required to send Version and Capability Indication Configuration Option to the UE unless it has first received this Configuration Option from the UE. In some implementations, the HSGW is not required to send Version and Capability Indication Configuration Option, for example, when no capabilities have been identified that the HSGW needs to notify to the UE.

TABLE 9

Version and Capability Indication Configuration Option

| 0 | 8 | 16 | 24 | 31 |
|---|---|---|---|---|
| Version | | List of Capabilities | | |

An example format of Version and Capability Indication Configuration Option is shown in Table 9. The "Version" field is one octet and indicates the version of X.S0057 specifications supported. An example "Version" value that can be supported is "0" which can indicate that requirements mandated by X.S0057-0 are supported. In some implementations, all other values may be Reserved. Value '0' is the default Version value at the UE and the HSGW. If no Version and Capability Indication Configuration Option is received, this Version value is assumed for the peer-entity. The "List of Capabilities" is a three octet bit-mask. The encoded values indicate the capabilities supported. See Table 10 for and example List of UE Capabilities. See Table 11 for an example list of HSGW Capabilities.

In some implementations, the List of UE Capabilities can be encoded as a bit-mask as defined in Table 10. C0 can be the most-significant bit. Each bit in the bit-mask indicates whether the corresponding UE capability as specified in the X.50057 release indicated by the Version field is supported.

TABLE 10

List of UE Capabilities

| Bit | UE Capability | Description |
|---|---|---|
| C0 to C3 | Reserved | |
| C4 | Max PPP Inactivity Timer | Set to '1' if UE supports the PPP Inactivity Timer. Else set to '0'. |
| C5 to C23 | Reserved | |

In some implementations, the List of HSGW Capabilities can be encoded as a bit-mask as defined in Table 11. CO can be the most-significant bit. Each bit in the bit-mask indicates whether the corresponding HSGW capability as specified in the X.S0057 release indicated by the Version field is supported.

TABLE 11

List of HSGW Capabilities

| Bit | UE Capability | Description |
|---|---|---|
| C0 to C23 | Reserved | |

Use of Max PPP Inactivity Timer Configuration Option

In some implementations, the UE and the HSGW can support a Max Inactivity Timer Configuration Option. In some implementations, the HSGW can support an Echo-Reply-Timeout timer and an Echo-Request-Retries counter.

In some implementations, the HSGW can set the value of the Max PPP Inactivity Timer Configuration Option for each UE. For example, for the default PPP Inactivity Timer, the value can be set to '0', or the value can be set to: PPP Inactivity Timer+Echo-Reply-Timeout timer (multiplied by) (Echo-Request-Retries+1). If the UE indicates its support for Max PPP Inactivity Timer by sending such capability in the Version and Capability Indication Configuration Option, the HSGW can send the Max PPP Inactivity Timer Configuration Option in a 3GPP2 VSP Parameter Configuration-Request packet. Subsequently, if the PPP Inactivity Timer value, Echo-Reply-Timeout and/or Echo-Request-Retries counters have changed due to an administrative or other action, the HSGW can again send the Max PPP Inactivity Timer Configuration Option in a 3GPP2 VSP Parameter Configuration-Request packet. In some cases, the UE can set a PPP Inactivity Timer to the time value received in the Max PPP Inactivity Configuration Option.

Once the PPP is in LCP Opened state and authentication has been completed and the PPP Inactivity Timer is set to a non-default value, in some implementations, the UE and the HSGW can start the PPP Inactivity Timer for the PPP session. The UE and the HSGW can reset the PPP Inactivity Timer upon detection of any traffic over any service connection (e.g., main or auxiliary service connection) for the UE.

In some implementations, upon expiration of the PPP Inactivity Timer, the HSGW can send an LCP Echo-Request packet as specified in RFC1661 to the UE over the main service connection, and start Echo-Reply-Timeout timer for the PPP session. The HSGW can also initialize the Echo-Request-Retries counter to the configured value.

In some implementations, upon receipt of an LCP Echo-Reply packet from the UE, or any other packet over any service connection for the UE, the HSGW can stop and reset the Echo-Reply-Timeout timer, reset the Echo-Request-Retries counter, and reset the PPP Inactivity Timer.

In some implementations, upon expiration of the Echo-Reply-Timeout timer and when the Echo-Request-Retries counter value is greater than zero, the HSGW can send an LCP Echo-Request packet to the UE over the main service connection, decrement the Echo-Request-Retries counter by one, and start the Echo-Reply-Timeout timer. Upon expiration of Echo-Reply-Timeout timer and when the Echo-Request-Retries counter value is equal to zero, the HSGW can close the PPP session. For example, the HSGW is not required to send an LCP Terminate-Request packet to the UE. The UE can then close the PPP session on the expiration of its PPP Inactivity Timer.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   operating a wireless communication system that includes a first wireless network based on a first wireless technology and a second wireless network based on a second wireless technology;
   processing a network based change to an Aggregated Maximum Bit Rate (AMBR) parameter that corresponds to an Access Point Name (APN); and
   communicating the network based change to a wireless device operating in the first wireless network via a message having a format specific to the second wireless technology;
   wherein the communicating is performed during an ongoing Internet Protocol-Connectivity Access Network (IP-CAN) session between the APN and the wireless device and wherein the message is for network-initiated changing of the AMBR of the ongoing IP-CAN session.

2. The method of claim 1, wherein communicating the network based change to the wireless device comprises sending information indicative of the AMBR parameter to the wireless device via a Vendor-Specific Network Protocol signaling.

3. The method of claim 1, wherein communicating the network based change to the wireless device comprises sending information indicative of the AMBR parameter to the wireless device via a Vendor-Specific Network Control Protocol signaling.

4. The method of claim 1, wherein communicating the network based change to the wireless device comprises sending information indicative of the AMBR parameter to the wireless device via a Vendor Specific Protocol.

5. The method of claim 1, further comprising:
   operating the wireless device to use the AMBR parameter for multiple Internet Protocol-Connectivity Access Network (IP-CAN) sessions.

6. The method of claim 1, further comprising:
   operating a network entity associated with the first wireless network to generate the network based change, wherein communicating the network based change to the wireless device comprises transmitting a change to the AMBR parameter via the second wireless network.

7. A wireless communication system comprising:
   a first wireless network to provide wireless service to wireless devices;
   a second wireless network to provide wireless service to wireless devices;
   a gateway, in communication with the first and second wireless networks, configured to process a network based change to an Aggregated Maximum Bit Rate (AMBR) parameter that corresponds to an Access Point Name (APN); and
   a base station, in the second wireless network, that is configured to communicate the network based change in a message to a wireless device, the message having a format specific to the first wireless network;
   wherein the base station communicates to the wireless device during an ongoing Internet Protocol-Connectivity Access Network (IP-CAN) session between the APN and the wireless device and wherein the message is for changing the AMBR of the ongoing IP-CAN session.

8. The system of claim 7, wherein the message is communicated via a Vendor-Specific Network Protocol signaling.

9. The system of claim 7, wherein the message is communicated to the wireless device via a Vendor-Specific Network Control Protocol signaling.

10. The system of claim 7, wherein the message is communicated to the wireless device via a Vendor Specific Protocol.

11. The system of claim 7, further comprising:
    a network entity, in communication with the first wireless network, that is configured to generate the network based change.

12. The system of claim 7, further comprising:
    a wireless device configured to receive a message describing the network based change, wherein the wireless device is configured to use the AMBR parameter for multiple Internet Protocol-Connectivity Access Network (IP-CAN) sessions.

13. The method of claim 1, wherein the message comprises a wildcard Internet Protocol (IP) address.

14. The system of claim 7, wherein the message comprises a wildcard Internet Protocol (IP) address.

* * * * *